United States Patent
Rigobert et al.

[11] Patent Number: 6,146,785
[45] Date of Patent: Nov. 14, 2000

[54] SEALED CELL HAVING A MULTILAYER CASE

[75] Inventors: Gérard Rigobert, Poitiers; Laurent Souliac, Saint Benoit, both of France

[73] Assignee: Alcatel, Paris, France

[21] Appl. No.: 09/172,863

[22] Filed: Oct. 15, 1998

[30] Foreign Application Priority Data

Oct. 16, 1997 [FR] France ................................. 97 12957
Nov. 27, 1997 [FR] France ................................. 97 14909

[51] Int. Cl.[7] ........................... H01M 10/40; B60R 16/04
[52] U.S. Cl. ........................... 429/94; 429/159; 429/177; 180/68.5
[58] Field of Search ............................. 429/159, 94, 177; 180/68.5

[56] References Cited

U.S. PATENT DOCUMENTS

| | | |
|---|---|---|
| 3,565,690 | 2/1971 | Jouchaud du Plessix et al. . |
| 3,775,182 | 11/1973 | Patton et al. . |
| 4,322,484 | 3/1982 | Sugalski . |
| 4,592,972 | 6/1986 | Juergens et al. ........................ 429/160 |
| 5,008,161 | 4/1991 | Johnston .............................. 429/94 X |
| 5,047,300 | 9/1991 | Juergens ................................. 429/94 |
| 5,518,836 | 5/1996 | McCullough . |
| 5,866,276 | 2/1999 | Ogami et al. ........................ 429/159 X |

FOREIGN PATENT DOCUMENTS

| | | |
|---|---|---|
| 0 822 605 A2 | 2/1998 | European Pat. Off. . |
| 35 28 462 A1 | 2/1987 | Germany . |
| 53-50449 | 5/1978 | Japan . |
| 59-96647 | 6/1984 | Japan . |
| 59-173944 | 10/1984 | Japan . |

OTHER PUBLICATIONS

Patent Abstracts of Japan, vol. 097, No. 006, Jun. 30, 1997 corresponding to JP 09 055213 A (Sony Corp) Feb. 25, 1997.

*Primary Examiner*—John S. Maples
*Attorney, Agent, or Firm*—Sughrue, Mion, Zinn, Macpeak & Seas, PLLC

[57] ABSTRACT

The invention provides a sealed organic-electrolyte cell. A spiral-wound group of electrodes have at least one alternation of negative electrode, separator and positive electrode. The cell has an enclosure made up of a cover and an end wall interconnected in a sealed manner by a side case surrounding the group. Each cover and end wall has a respective current outlet terminal and a central core around which the electrode group is spiral-wound, with an end wall and the cover being fixed to the ends thereof. The case surrounding the group is made of a combined metal-and-plastics multilayer material of a thickness that is smaller than 0.5 mm. The invention also provides a module of such cells and a battery that has at least one such module. The battery is suitable for use as the battery of an electric vehicle.

10 Claims, 2 Drawing Sheets

SEALED CELL HAVING A MULTILAYER CASE

The present invention relates to a sealed cell having a multilayer case. More particularly, the invention relates to such a cell having a spiral-wound electrode group.

BACKGROUND OF THE INVENTION

In a known embodiment, sealed cells have an electrochemical group including at least one alternation of negative electrode, separator, and positive electrode, together with an enclosure made up of a cover, an end wall, and a case, said case surrounding said group, and said cover and said end wall each having a respective current outlet terminal.

Cells that operate with an organic electrolyte need to be housed in an enclosure that provides adequate sealing. The case must prevent external elements such as moisture or oxygen in the air, and in particular moisture, from penetrating into the inside of the cell and thus coming into contact with the electrochemical group. In addition, said enclosure must prevent electrolyte passing out from the cell. In order to avoid making the cell pointlessly heavy, the mass of the components constituting the enclosure must be as small as possible. For high-capacity cells, in order to avoid taking up too much volume compared with the working volume of the electrochemical group, the thickness of each of the components of the enclosure must be as small as possible. In order to be technically feasible, enclosures made of metal must be of considerable thickness, e.g. 0.3 mm to 1 mm, and therefore of considerable weight. Enclosures made of plastics are lighter in weight but give rise to problems of sealing, in particular to-ingress of moisture into the cell. This requires them to be thicker, e.g. at least 1 cm thick.

Japanese application JP-A-63.181.272 describes a sealed cell comprising a one-piece enclosure constituted by an outer film of light metal, e.g. aluminum, and an inner film of resin, e.g. polyethylene, with the hermetic seals for the electrodes being provided by epoxy resin. Such cells nevertheless suffer from a problem of insufficient mechanical strength.

Thus the problem which is posed is that of providing a cell which is simultaneously sealed, both from the inside of the cell to the outside and from the outside of the cell to the inside, that possesses sufficient mechanical strength to provide said cell with a good lifetime, and whose enclosure is relatively lightweight and relatively thin. The cell of the invention solves the problem posed in that by combining two means, namely a case of multilayer material and a central supporting core, it makes it possible to provide sealing, mechanical strength, small volume occupied by the enclosure, and an overall assembly that is light in weight.

OBJECTS AND SUMMARY OF THE INVENTION

The present invention provides a sealed organic-electrolyte cell comprising:
- a spiral-wound group of electrodes comprising at least one alternation of negative electrode, separator, and positive electrode;
- said cell including:
  - an enclosure made up of a cover and an end wall interconnected in sealed manner by a side case surrounding said group, each of said cover and said end wall having a respective current outlet terminal; and
  - a central core around which the electrode group is spiral-wound, with the end wall and the cover being fixed to the ends thereof;
  - and the case surrounding said group is made of a combined metal-and-plastics multilayer material of thickness that is smaller than 0.5 mm.

In an embodiment, said multilayer material is two-layer material.

The thickness of the multilayer material preferably lies in the range 0.1 mm to 0.5 mm.

One of the advantages of having a central core present is that it enables the cell to be given good mechanical strength. In addition, the use of such a multilayer material for the case of the cell makes it possible to improve said cell both respect to cost and with respect to weight of the cell and volume occupied by its enclosure.

Another advantage of using such multilayer material is the possibility of the case destroying itself automatically in the event of an operating anomaly, generally in the event of high temperature (e.g. higher than 150° C.) or in the event of an increase in internal pressure, thereby making it possible to provide greater safety for the user.

Finally, an additional advantage of using such a multilayer material is the possibility of providing sealing between the case and the end wall (or the cover) by heat-sealing rather than by using epoxy resin adhesive only, thereby providing better effectiveness and better handling during the process of manufacturing such a cell.

The invention also provides a module of the above-described cells, said module comprising a one-piece container having compartments each housing one such cell, said cells being interconnected in series and/or in parallel; the container typically having six compartments operating in a configuration of three in series by two in parallel or of two in series by three in parallel. Finally, the invention also provides a battery comprising at least one module as described above, and typically comprising thirty modules operating in series, and a vehicle having at least one propulsion means powered by a source of energy comprising at least one such battery. The invention thus applies in particular to using the above-described battery as a battery for an electric vehicle.

BRIEF DESCRIPTION OF THE DRAWINGS

The invention will be better understood and other advantages and features will appear on reading the following description given in non-limiting manner with reference to the accompanying drawings in which.

MORE DETAILED DESCRIPTION

Figure 1:
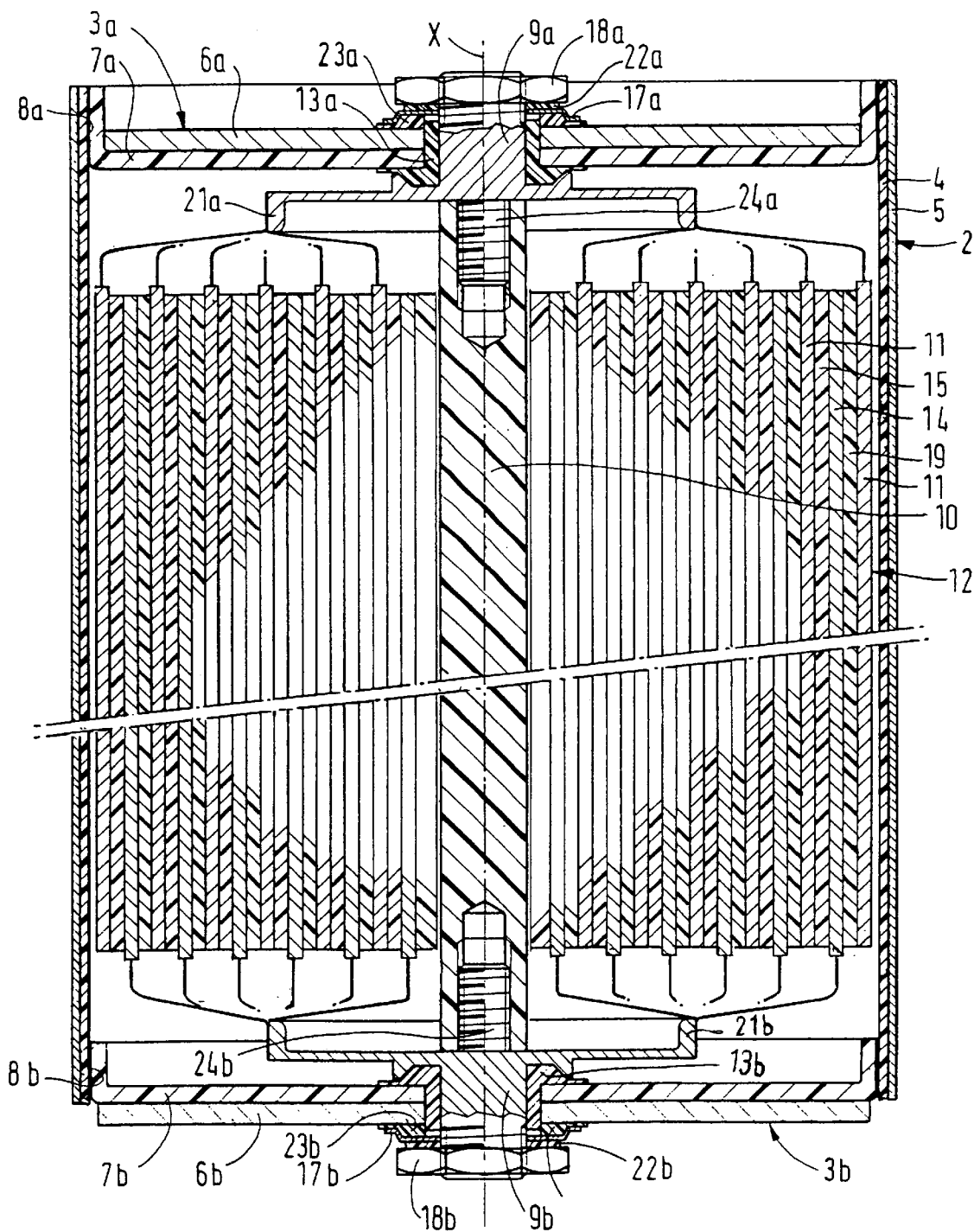
FIG. 1 is a diagrammatic longitudinal section through a cell of the invention and FIG. 2 is a diagrammatic outside view of a module provided in a one-piece container of the invention.

The cell 1 comprises an electrochemical group 12 made up of a positive electrode 11, a separator 15, a negative electrode 14, and a separator 19, said group being spiral-wound around a central core 10 of axis X.

The cell 1 has a side case 2 together with a cover 3a and an end wall 3b with respective current outlet terminals 9a and 9b. Together, the case 2, the end wall 3b, and the cover 3a form the enclosure of the cell 1 and they are connected together in sealed manner. The cover 3a and the end wall 3b are fixed to the corresponding ends of the central core 10.

The case 2 of the cell 1 is a body of revolution. It is substantially cylindrical.

The case 2 is constituted by a film whose thickness is less than 0.5 mm, which film is made up of a multilayer material, two-layer in this case, and can be formed by co-laminating a metal sheet 5 and a plastics sheet 4. The metal 5 can be aluminum or stainless steel. The plastic 4 can be polypropylene or polyethylene. The thickness of the metal layer within said material can, for example, be no more than about 0.1 mm.

The cover 3a is made of multilayer material, a two-layer material in this case, and can be formed by co-laminating a metal 6a and a plastic 7a. The metal 6a can be aluminum or stainless steel. The plastic 7a can be polypropylene or polyethylene. The thickness of the cover 3a generally lies in the range 0.5 mm to 3 mm. The thickness of the metal layer on its own in said material may for example be no more than about 0.1 mm. Identical considerations apply to the end wall 3b and to its metal and plastics sheets 6b and 7b.

The case 2 is made by winding the multilayer sheet into a cylindrical structure with overlapping edges and then holding the resulting cylinder together by adhesive or preferably by heat-sealing along an axis parallel to the longitudinal axis. The case can also be made by winding the composite sheet around the cylindrical group and then holding together the resulting cylinder with overlapping edges.

In the example shown in FIG. 1, the cover 3a is assembled to the case 2 by circular heat-sealing 8a so as to guarantee a sealed connection. The same applies to the end wall 3b and circular heat-sealing 8b. Said assembly can be performed by any means known to the person skilled in the art, e.g. using adhesive. So as to make heat-sealing easier, and thus facilitate the operation of manufacturing the cell, the cell of the invention as shown in FIG. 1 has its two-layer materials oriented as follows: the metal portion 5 of the case 2 is situated on the outside of said cell and the metal portion 6a of the cover 3a is also situated on the outside of said cell, as is the metal portion 6b of the end wall 3b. However any combination is, a priori, possible in the context of a multilayer material for the case and for the cover or the end wall, with the inside of the cover, or of the end wall, or of the case being made of a metal material or of a plastics material.

Outlet terminal 9a serves to collect current from the positive electrodes 11 via a connection piece 21a interconnecting the outlet terminal and the electrodes. Similarly the outlet terminal 9b collects current from the negative terminals 14 via a connection piece 21b interconnecting the outlet terminal and the electrodes. Each of these end assemblies is sealed by a respective gasket 13a or 13b which bears against the core 10 and the cover 3a or the end wall 3b on the corresponding connection piece 21a or 21b. A clamping cup 17a is applied on a gasket 23a and has a plastics washer 22a applied thereagainst. Similarly a clamping cup 17b is applied against a gasket 23b and has a plastics washer 22b applied thereagain. The entire assembly is held by a corresponding screw 24a or 24b held by a respective lock nut 18a or 18b.

The cell shown in FIG. 1 was manufactured as follows: the electrochemical group 12 was wound on the core 10 and then the electrode connections 21a and 21b were put into place; the gasket 13b was installed on one end of the core; then the end wall 3b was installed over the gasket 13b; finally clamping was performed by installing the parts 24b, 23b, 17b, 22b, and 18b. The group was then inserted into the case 2 with holding means (e.g. vacuum means) serving to spread apart the walls of the case 2 while the group 12 was being inserted therein. The end wall was then heat-sealed at 8b to the case. Thereafter the cover was put into place by inserting the pieces 13a, 3a, 24a, 23a, 17a, 22a, and 18a. Finally heat-sealing was performed at 8a.

Figure 2:
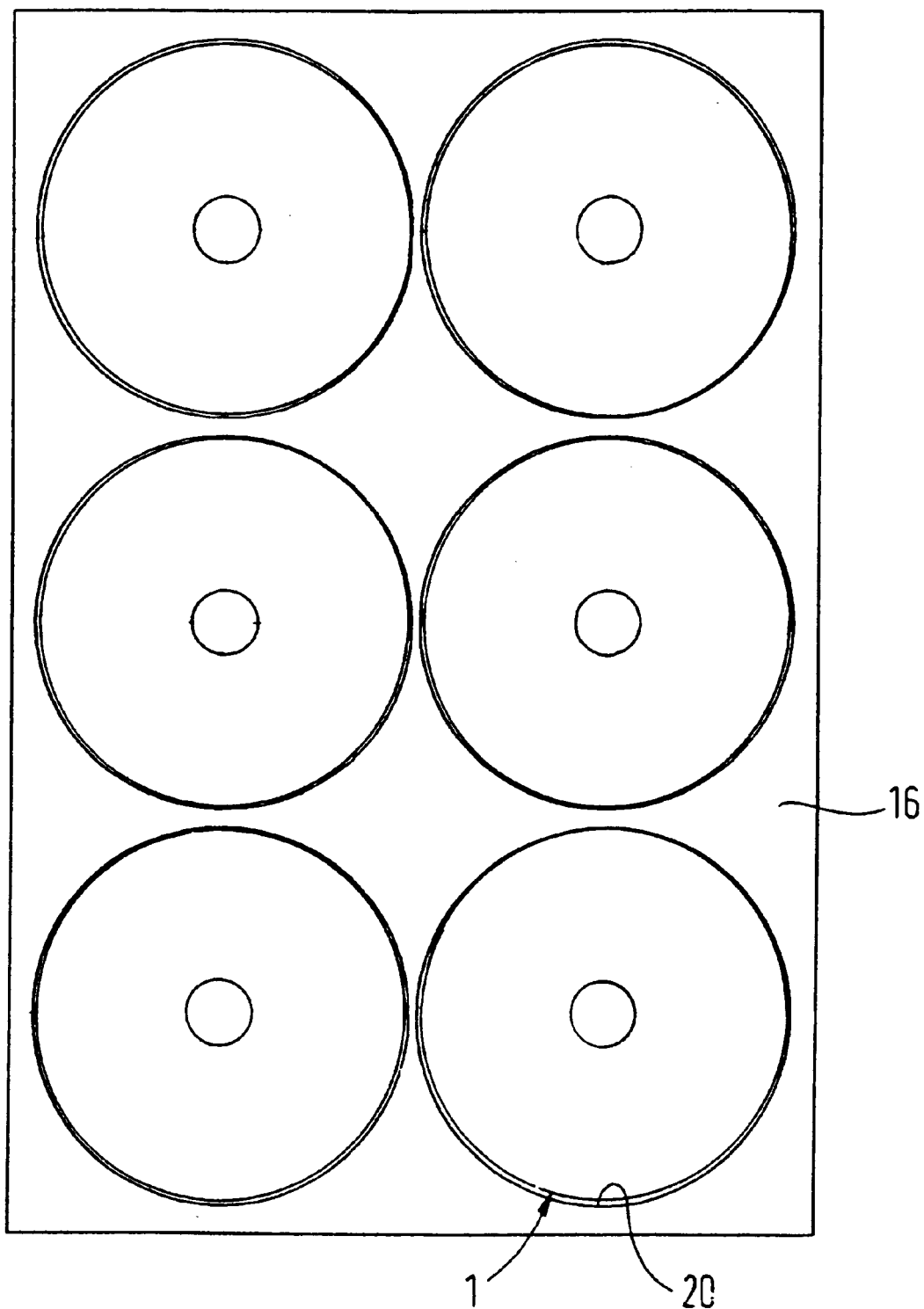

FIG. 2 is a diagrammatic view showing the outside of a module made up of a one-piece container 16 of the invention having six compartments 20 each containing a respective cell 1 as shown in FIG. 1. The cell 1 as inserted in this way into a compartment of said container is thus supported mechanically by the walls of the compartment 20 containing it. The small bulk of the case 2 makes it possible for each compartment to have a large volume fraction thereof occupied by working volume of the electrochemical group.

The case 2 shown in FIG. 1 is substantially cylindrical. It could also be prismatic.

Another embodiment is such that the cover 3a, and also the end wall 3b, is made of a metal material of thickness lying in the range 0.5 mm to 3 mm (not shown).

The cell of the invention operates, for example, with a liquid organic electrolyte, however the electrolyte could also be a solid polymer. The electrochemical couple involved is generally a rechargeable lithium-ion couple, however the invention can be extended to any primary or secondary cell using lithium metal.

What is claimed is:

1. A sealed organic-electrolyte cell comprising:

a spiral-wound group of electrodes comprising at least one alternation of negative electrode, separator, and positive electrode;

said cell including:

an enclosure made up of a cover and an end wall interconnected in sealed manner by a side case surrounding said group, each of said cover and said end wall having a respective current outlet terminal; and a center core around which the electrode group is spiral-wound with the end wall and the cover being respectively fixed to opposite ends of the central core;

and the case surrounding said group is made of a combined metal-and-plastics multilayer material of thickness that is smaller than 0.5 mm.

2. A cell according to claim 1, in which the case surrounding said group is made of a combined metal-and-plastics multilayer layer of thickness lying in the range 0.1 mm to below 0.5 mm.

3. A cell according to claim 1, in which said multilayer material of the case surrounding the group is a two-layer material.

4. A cell according to claim 1, in which at least one of the following parts: the cover and the end wall; is made of a combined metal and plastic multilayer material of thickness lying in the range 0.5 mm to 3 mm.

5. A cell according to claim 4, in which said part and the case are assembled together by heat-sealing.

6. A cell according to claim 4, in which the multilayer material of said part is a two-layer material.

7. A cell according to claim 1, in which at least one of the following parts: the cover and the end wall; is made of a metal material of thickness lying in the range 0.5 mm to 3 mm.

8. A module of cells, the module comprising a one-piece container having compartments each housing said cell of claim 1, said cells being interconnected in series and/or in parallel.

9. A battery comprising at least one module according to claim 8.

10. A vehicle having propulsion means powered by an energy source comprising at least one battery according to claim 9.

* * * * *